United States Patent Office 2,802,680
Patented Aug. 13, 1957

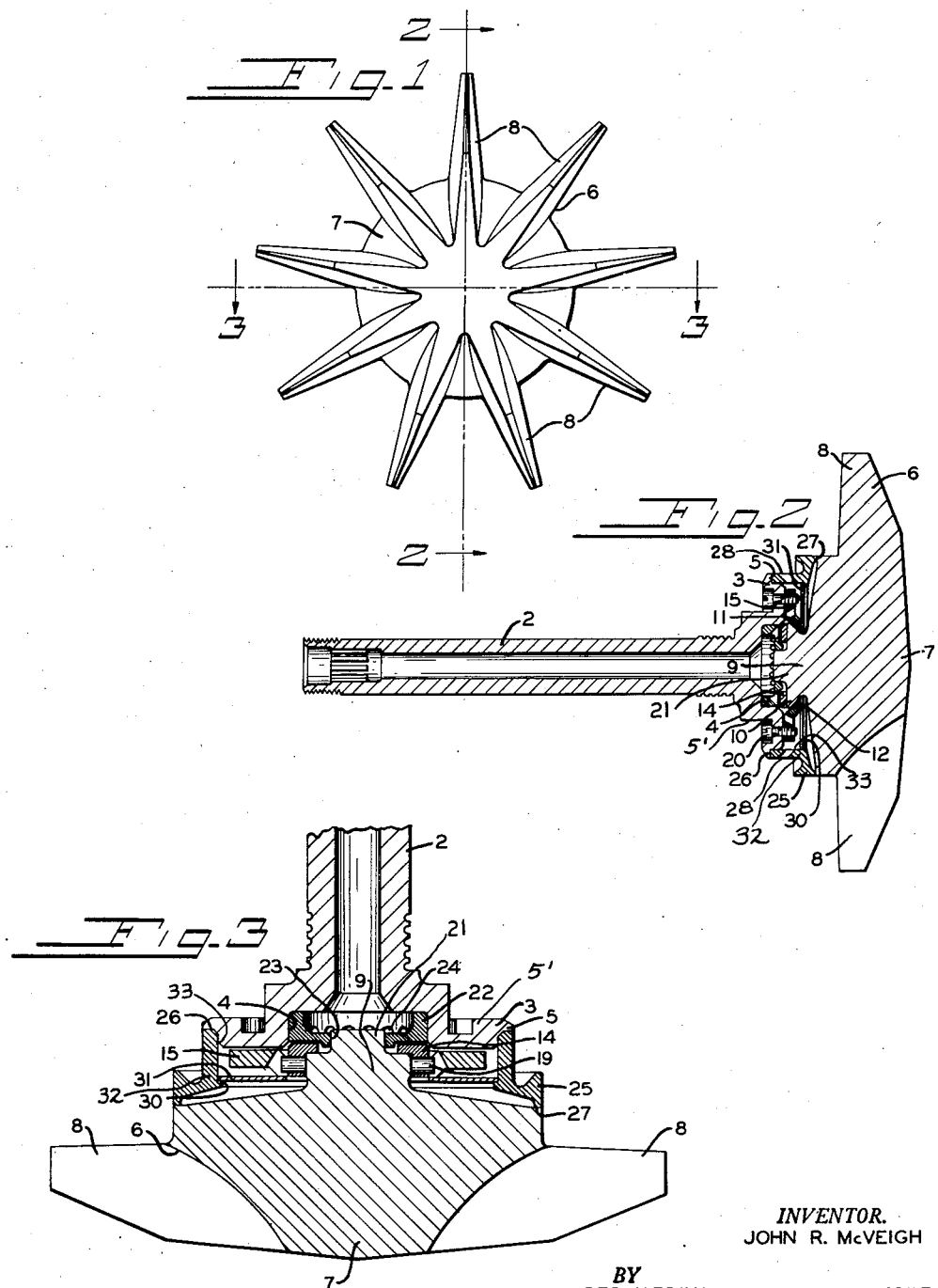

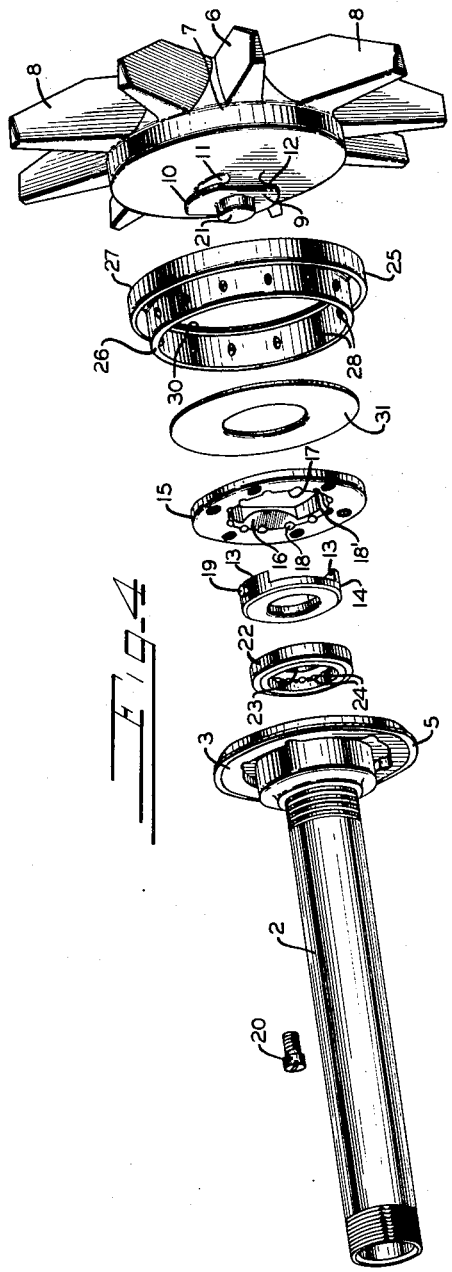

2,802,680

TURBINE WHEEL ASSEMBLY

John R. McVeigh, Latrobe, Pa., assignor to Kennametal Inc., Latrobe, Pa., a corporation of Pennsylvania Application May 15, 1952, Serial No. 287,847

11 Claims. (Cl. 287—53)

This invention relates to a turbine wheel assembly, and it particularly pertains to a turbine wheel having its thickest part at the center or hub and constructed so that maximum lateral support may be effected with a shaft and with those portions exposed that need to be machined for making the assembly.

The invention is an improvement over the turbine wheel assembly of my Patent 2,662,725 issued December 15, 1953 from earlier application Serial No. 145,635, filed February 23, 1950, and likewise has to do with turbine wheels or impellers that are readily detachably mounted on the end of the shaft and adapted to work at temperatures considerably higher than those to which the shaft is heated.

The turbine impeller or wheels are made of cemented hard carbide composition, such as cemented titanium carbide, which present special problems because of their hardness. The turbine wheel or impeller has to be mounted on the end of a steel shaft to transmit torque thereto, and ordinary fastening means are not satisfactory since the cemented hard carbide material is too hard to be milled or tapped by usual machine operations. There is also the problem of different coefficients of expansion of the steel shaft and the cemented hard carbide wheel or impeller.

The present invention involves the same general principles as my earlier invention in respect to securing a readily detachable rigid mounting in spite of the difference in coefficients of expansion of the materials with the added features of having the center or hub of the wheel of greater thickness, providing increased lateral support for the shaft, exposing the portion of the hub which needs to be machined for making the assembly, and providing a centering means which is unaffected by the coefficients of expansion of the parts of the assembly.

Accordingly, one of the principal objects of my invention is an assembly of a turbine wheel and shaft, of different coefficients of expansion, which provides a large area of contact for good lateral support between the elements.

Another object of the invention is provision of a turbine wheel having its thickest portion at the center or hub, with the machined portions of the wheel for seating the shaft externally exposed.

Another object of the invention is to provide means on the wheel, of small dimension, for cooperating with the centering means between said wheel and shaft.

Still another object of the invention is to provide an assembly in which the parts are positively locked together. Other objects, and objects relating to details of construction, will definitely appear from the detailed description to follow. In one instance, I accomplish the objects of my invention by the construction described in the following specification. The invention is clearly defined and pointed out in the appended claims. A preferred embodiment of the invention is illustrated in the accompanying drawings, in which:

Fig. 1 is an end view of the side of a turbine wheel assembly, opposite the shaft seating side, embodying the invention.

Fig. 2 is a longitudinal sectional view on line 2—2 of Fig. 1.

Fig. 3 is an enlarged longitudinal sectional view of the assembly at right angles to that in Fig. 2.

Fig. 4 is an exploded view of the parts comprising the assembly.

Generally described, the invention comprises a turbine wheel or impeller having a thickened central portion with a hub projection extending therefrom to which the shaft is connected, said projection having two oppositely disposed flanges spaced from the central portion of the impeller and circumferentially spaced from each other. This hub projection is also provided with a smaller centrally located post for centering the shaft. A supporting annulus with a hub-engaging portion is interposed between the central portion of the wheel and the shaft, this being fitted into place when the shaft with assembly parts connected thereto are connected to the wheel.

The impeller end of the shaft terminates in an integrally formed spider, or one attached thereto, the impeller end of the spider being provided with a seat for one end of a pilot sleeve that is interposed between said spider and the wheel with its opposite end seated on the centering post of the wheel hub projection. An impeller retaining ring is fastened to the spider by an annular series of clamp screws, said ring being provided with oppositely positioned, inwardly extending offset ears for engaging the overhanging flanges of the hub projection, these ears being engaged with the overhanging flanges by first fitting said ring axially upon the hub projection with the ears in alignment with the spaces between the flanges of the hub projection, and then turning the ring 90°. A lock ring is located in the center of the retaining ring and is provided with wings for filling the spaces between the flanges of the hub projection, said lock ring having a radial pin or pins for interengaging with the retaining ring to prevent them turning relatively to each other. The above-mentioned annularly disposed screws are then tightened to secure the parts in assembled relation. The supporting annulus, surrounding the retaining ring is interposed with one end seated against the spider and its opposite end against the central portion of the impeller wheel to give increased lateral support.

Referring specifically to the drawings in which like numerals designate like parts, numeral 2 indicates a hollow steel shaft having a spider 3 integrally formed on one end thereof. The end face of the spider is provided with an internal annular seat or cup 4 and an outer annular seat 5 for purposes hereinafter set forth, there being an intermediate web 5' for seating the hereinafter described impeller retaining ring that is clamped thereto.

A turbine wheel or impeller 6, preferably formed from cemented hard carbide, is constructed to be detachably mounted on the end of the spider, said wheel having a central thicker portion 7 with radially extending blades 8. One side face of the central portion 7 of the wheel is provided with a central hub projection 9 having oppositely disposed flanges 10, spaced from the central portion of the wheel at 11, the inner faces of the flanges being beveled at 12, and the flanges being spaced circumferentially from each other, forming segmental spaces to receive the wings 13 of lock ring 14 which is fitted to the hub projection 9 with an impeller retaining ring 15 and locks the retaining ring against turning. The retaining ring 15 is provided with two inwardly extending ears 16, offset laterally, for engaging the flanges 10 of the hub projection 9. The retaining ring 15 is slipped on the hub projection axially with the inwardly extending ears in alignment with the spaces between flanges 10 until said ears are aligned with the notches 11 formed by the overhanging flanges, after which the retaining ring is turned through 90° to engage its offset ears 16 behind the overhanging flanges 10 of the hub projection. Then the lock ring 14 will be fitted into the central recess 17 of the retaining ring with its wings 13 fitting the segmental spaces between the ears 16 and the flanges 10. The wall of the central recess 17 of the retaining ring 15 is provided with circumferentially arranged cooling passages or holes 18, some of which extend through the inwardly extending ears. Radial pins 19 are provided on the lock ring 14, at diametrically opposite points, to engage notches 18' in the retaining ring, to prevent said lock ring from being turned relative to the retaining ring when they are assembled. After the retaining ring is assembled in locking position with the hub projection, it is bolted to the shaft spider 3 by screws 20.

The hub projection 9 is also provided with a centering post 21, and a pilot sleeve 22 is interposed between the shaft and the impeller wheel, the end of the sleeve 22 being seated in the internal annular seat or cup 4 of the spider with its opposite end seated on the centering post 21 of the hub projection 9 by means of central opening 23 in the sleeve. An annular row of passages 24 is provided in the pilot sleeve 22 to permit the circulation of air through the shaft and the assembly adjacent the face of the wheel.

In order to obtain a wider area of contact between the spider and the wheel and thereby provide greater lateral support, a supporting annulus 25 is interposed therebetween, the edge 26 of the annulus fitting in seat 5 of the shaft spider and edge 27 fitted against the central portion of the wheel near its outer periphery. Passages 28 are formed in the annulus 25 to allow for the circulation of air therethrough. The wall 32 of the central opening 33 in the supporting annulus 25 is provided with an inturned bead 30 in position to contact the outer portion of a heat insulating disc or baffle 31 to be inserted between said bead and the edges of the wings 13 of the lock ring 14.

To assemble the impeller wheel 7 and shaft 2, the supporting annulus 25 is first placed with its edge portion 27 resting on the central portion of the impeller wheel and the baffle 31 is then inserted to rest on the bead 30 with the hub projection 9 protruding through the central opening of the baffle. The impeller retaining ring 15 is then placed over the hub projection 9 and rotated through 90°, so that ears 16 engage behind flanges 10 to lock the retaining ring to the impeller. The lock ring 14 is then inserted in the retaining ring 15 with pins 19 lodged in notches 18', thus preventing relative turning of rings 14 and 15. The pilot sleeve 22 is then positioned on protruding centering post 21 and the shaft 2 and spider 3 are positioned with the pilot sleeve 22 received in the cup 4 of the spider, and seat 5 of the spider engaging the edge portion 26 of the supporting annulus 25. The spider is then firmly secured to the impeller retaining ring 15 by screws 20, thus securing all parts of the mounting to the impeller wheel and the shaft.

To carry heat away from the impeller, cooling air enters through holes 28 in the supporting annulus 25, passes through holes 18 in the retaining ring 15, through holes 24 in the pilot sleeve and out through tubular shaft 2.

From the foregoing description, it will be seen that the hub projection 9 for making the assembly with the shaft spider is externally located and exposed so that it can be more readily machined. The centering post 21 is of relatively small diameter, thus minimizing effects due to differences in coefficients of expansion of the different materials employed. This provides a rigid mount, even though the temperatures and coefficients of expansion of the parts are different. Good heat insulation and cooling between the impeller and the mount are provided. The impeller wheel is thickest at its hub portion where subjected to the greatest stresses, and the face of the central portion of the wheel provides for a large area of contact for the shaft spider so that maximum lateral support is obtained.

I am aware that there may be various changes in details of construction without departing from the spirit of my invention, and, therefore, I claim my invention broadly as indicated by the appended claims.

Having thus described my invention, what I claim as new and useful and desire to secure by U. S. Letters Patent is:

1. A turbine wheel and shaft assembly comprising the combination of a wheel having a central hub projecting laterally from one side of the central portion of the wheel, said hub having a pair of diametrically opposed radially extending flanges, circumferentially spaced from each other and spaced from the said side of the central portion of the wheel to form a pair of notches, a centering post extending laterally from the hub coaxial therewith, a shaft terminating in a spider, a retaining ring detachably secured to the spider and surrounding said hub, said ring having means for interlocking with said hub by rotation of the ring about its axis, a locking means for preventing rotation of said retaining ring about said hub, and a pilot sleeve seated on the centering post and in the spider.

2. The turbine wheel and shaft assembly of claim 1 in which the retaining ring is provided with a pair of diametrically opposed inwardly extending ears engageable in the notches between said flanges and the central portion of the wheel.

3. The turbine wheel and shaft assembly of claim 2 in which the locking means is pinned to the retaining ring to prevent them from turning relative to each other.

4. The turbine wheel and shaft assembly of claim 3 in which the locking means is in the form of a lock ring provided with laterally extending wings received in the spaces between the ears of the retaining ring and the flanges of the hub.

5. The turbine wheel and shaft assembly of claim 1 including a supporting annulus surrounding the retaining ring and seated against the spider and the central portion of the wheel.

6. The turbine wheel and shaft assembly of claim 5 in which an insulating disc is interposed between the supporting annulus and the hub.

7. A turbine wheel and shaft assembly comprising the combination of a wheel having a hub projecting laterally from the center of one side thereof, a retaining ring surrounding said hub, said hub and ring having locking flanges adapted to interengage upon rotation of the ring on the hub to prevent movement of the ring axially of the hub, means to prevent turning of the ring relative to the hub, a shaft having a spider fixed to one end thereof, and means for detachably securing the spider to the retaining ring.

8. The turbine wheel and shaft assembly of claim 7 including a supporting annulus surrounding the hub and ring and seated on the side of the wheel and on the spider.

9. The turbine wheel and shaft assembly of claim 8 including a centering post projecting axially from the end of the hub and a pilot sleeve seated on said post and within said spider.

10. The turbine wheel and shaft assembly of claim 9 in which the shaft is tubular and the annulus, ring and pilot sleeve are provided with ports for the passage of air therethrough, whereby cooling air may enter through said annulus, circulate through the ring and sleeve, and pass out through the tubular shaft.

11. The turbine wheel and shaft assembly of claim 10 including a heat insulating disc supported by the annulus, surrounding the hub, and interposed between the side of the wheel and the retaining ring.

(References on following page)

References Cited in the file of this patent

UNITED STATES PATENTS

| | | |
|---|---|---|
| 1,403,201 | Shaw | Jan. 10, 1922 |
| 1,838,935 | Fixsen | Dec. 29, 1931 |
| 2,051,965 | Roth | Aug. 25, 1936 |
| 2,557,747 | Judson et al. | June 19, 1951 |
| 2,602,683 | Aue | July 8, 1952 |

FOREIGN PATENTS

| | | |
|---|---|---|
| 903,268 | France | Jan. 10, 1945 |